United States Patent
Krist et al.

(10) Patent No.: US 12,202,955 B2
(45) Date of Patent: Jan. 21, 2025

(54) POLYETHYLENE FOAM COMPOSITION

(71) Applicant: SABIC GLOBAL TECHNOLOGIES B.V., Bergen Op Zoom (NL)

(72) Inventors: Johan Maria Krist, Geleen (NL); Mark Leo Hendrik Theunissen, Geleen (NL); Douwe Wiebe Van Der Meer, Geleen (NL); Maria Johanna Willems, Geleen (NL); Emanuel Joseph Herman Marie Van Der Meer, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 741 days.

(21) Appl. No.: 17/419,119

(22) PCT Filed: Dec. 11, 2019

(86) PCT No.: PCT/EP2019/084766
§ 371 (c)(1),
(2) Date: Jun. 28, 2021

(87) PCT Pub. No.: WO2020/136011
PCT Pub. Date: Jul. 2, 2020

(65) Prior Publication Data
US 2021/0395502 A1    Dec. 23, 2021

(30) Foreign Application Priority Data
Dec. 28, 2018   (EP) .................................... 18248118

(51) Int. Cl.
*C08L 23/06* (2006.01)
*C08J 3/22* (2006.01)
(Continued)

(52) U.S. Cl.
CPC ................. *C08L 23/06* (2013.01); *C08J 3/22* (2013.01); *C08J 9/0061* (2013.01); *C08J 9/141* (2013.01);
(Continued)

(58) Field of Classification Search
CPC ................................ C08L 23/06; C08K 5/103
See application file for complete search history.

(56) References Cited

U.S. PATENT DOCUMENTS 10,011,697 B2 * 7/2018 Van der Ven ............. B32B 5/18
11,697,720 B2 * 7/2023 Renders .................. C08L 53/00
521/81
(Continued)

FOREIGN PATENT DOCUMENTS

CN   103980597 A  *  8/2014  ............. C08L 23/06
EP     1308475 A2     5/2003
(Continued)

OTHER PUBLICATIONS

Alt et al., "Bimodal Polyethylene—Interplay of Catalyst and Process," Macromol. Symp. 2001, vol. 163, pp. 135-143.
International Search Report for International Application No. PCT/EP2019/084766, International Filing Date Dec. 11, 2019, Date of Mailing Feb. 18, 2020, 4 pages.
(Continued)

*Primary Examiner* — Rip A Lee
(74) *Attorney, Agent, or Firm* — CANTOR COLBURN LLP

(57) ABSTRACT

The present invention relates to a polyethylene composition comprising a) a polyethylene blend comprising from 95.5% to 99.5 wt % low density polyethylene (LDPE) and from 0.5% to 4.5 wt % high density polyethylene (HDPE), wherein the wt % (% by weight) is based the total amount of low density polyethylene and high density polyethylene in the blend, and b) a mixture of glycerol-mono-stearate and glycerol-mono-palmitate.

16 Claims, 1 Drawing Sheet

(51) Int. Cl.
*C08J 9/00* (2006.01)
*C08J 9/14* (2006.01)
*C08K 5/103* (2006.01)

(52) U.S. Cl.
CPC ........... *C08K 5/103* (2013.01); *C08J 2201/03* (2013.01); *C08J 2203/14* (2013.01); *C08J 2323/06* (2013.01); *C08L 2203/18* (2013.01); *C08L 2205/025* (2013.01); *C08L 2207/062* (2013.01); *C08L 2207/066* (2013.01)

(56) References Cited

U.S. PATENT DOCUMENTS

| | | | | |
|---|---|---|---|---|
| 2010/0196641 | A1* | 8/2010 | De Vos | C08J 9/08 521/134 |
| 2015/0359217 | A1* | 12/2015 | Narita | A23B 7/154 514/552 |
| 2020/0317877 | A1* | 10/2020 | van der Ven | C08L 23/06 |

FOREIGN PATENT DOCUMENTS

| | | |
|---|---|---|
| EP | 3252095 A1 | 12/2017 |
| WO | 2008100501 A2 | 8/2008 |
| WO | WO-2013190069 A1 * 12/2013 ............ C08J 9/0061 |

OTHER PUBLICATIONS

PE 100 Pipe Systems, second edition, Heiner Bromstrup (editor), 2004, pp. 16-20 ISBN 3-8027-2728-2.

Peacock Andrew J., "Handbook of Polyethylene", Chapter 3 Production Processes, 2000, Marcel Dekker, Inc., New York; ISBN 0824795466; p. 43-66.

Ruinaard "How to Choose a Polyolefin Grade for Physical Foaming" RAPRA Conference Presentation—Blowing Agents and Foaming Processes (2005); 32 Pages.

Weber et al., "Foamed Plastics" Ullmann's Encyclopedia, 2002, Wiley VCH Verlag, 54 Pages.

Written Opinion for International Application No. PCT/EP2019/084766, International Filing Date Dec. 11, 2019, Date of Mailing Feb. 18, 2020, 5 pages.

* cited by examiner

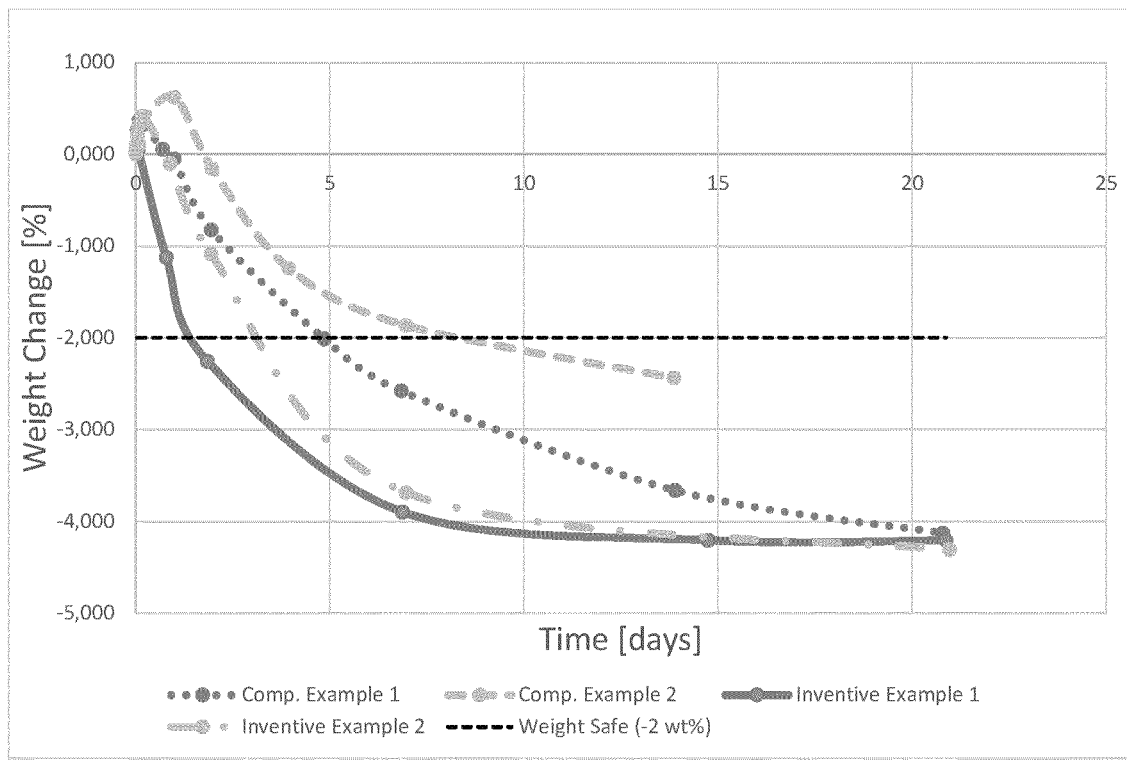

POLYETHYLENE FOAM COMPOSITION

CROSS REFERENCE TO RELATED APPLICATIONS

This application is a National Stage application of PCT/EP2019/084766, filed Dec. 11, 2019, which claims the benefit of European Application No. 18248118.4, filed Dec. 28, 2018, both of which are incorporated by reference in their entirety herein.

The invention relates to a polyethylene foam composition and a fast degassing process after the foaming process.

Polyolefin foams are described in Ullmann's Encyclopedia "Foamed Plastics" by Heinz Weber et al. (2002; Wiley VCH Verlag). These foams are classified as low density and high density foams. These foams may be non-crosslinked or crosslinked foams.

Polyolefin foams are often made from low density polyethylene (LDPE). Foam based on LDPE can be shaped in different semi-finished products such as for example sheets, rods, profiles and tubes. The foaming of LDPE results in a material with a substantially reduced density. LDPE applied as the raw material for the foam has a specific density of for example about 915-935 kg/m$^3$, whereas the density of the LDPE foam may range for example from 15-300 kg/m$^3$. In addition to the weight reduction that is changed during the foam process also other properties, such as mechanical properties, that are gained by the LDPE in its foamed state are jointly responsible for the many applications of the obtained foam.

Polyolefin foam may be produced via a chemical blowing process or via a physical blowing process. Physically blown polyolefin foam is commonly produced with blowing agents such as isobutane, pentane and cyclopentane. In general, physically blown polyolefin foams have the advantage that they yield in a higher expansion and thus in a lower density compared to chemically blown polyolefin foams.

Such physically blown foams can be produced for example through extrusion technology. In this process the physical blowing agent is injected directly into the polyolefin melt under pressure and homogeneously dissolved and mixed into the molten polyolefin. A minimum pressure, which depends on the blowing agent used and the prevailing melt temperature, is needed to keep the blowing agent dissolved in the polyolefin melt. In order to prevent the blowing agent from expanding prematurely from the melt, this pressure needs to be maintained during the whole extrusion process. Only when exiting from the die, the melt pressure is decreased to atmospheric pressure and the blowing agent expands immediately in the melt to form the foam.

After foam production, the blowing agent is still present in the foam. However, a slow gas exchange will take place, i.e. the blowing agent is exchanged by air. This process is also known as degassing. The degassing time depends for example on the thickness of the foam and the degassing temperature, and will take between 5 days up to 3 weeks. This period may be even much longer for specific products or in case of for example co-extruded sheets, very thick products or products winded on large rolls.

Slow degassing is a disadvantage for the foam converter, because during this period the produced foamed article cannot be converted. The production of sandwich structures, such as laminated products, with physically blown foam directly after its production, will lead for examples to blisters during degassing. Furthermore, foamed articles that were foamed with a flammable blowing agent cannot be converted with any process where heat is involved before degassing took place due to safety reasons. Another disadvantage is that the transport of foamed articles where a flammable blowing agent was used during the foaming process is hazardous when the transport takes place shortly after the production due to the risk of explosion or fire.

An object of the present invention is to provide a polyolefin composition which results in a fast degassing foam after the polyolefin resin composition has been foamed by a physical foaming process in the presence of a physical blowing agent.

This object is achieved by a polyethylene composition comprising
  a) a polyethylene blend comprising from 95.5% to 99.5 wt % low density polyethylene (LDPE) and from 0.5% to 4.5 wt % high density polyethylene (HDPE), wherein the wt % (% by weight) is based the total amount of low density polyethylene and high density polyethylene in the blend, and
  b) a mixture of glycerol-mono-stearate and glycerol-mono-palmitate.

Surprisingly it was found that the foam produced using the polyethylene composition according to the invention shows a fast degassing when a physical foaming process in the presence of the physical blowing agent is applied. Producers can use for example their produced foams after 1-2 days in their conversion processes instead of after more than for example 5 days. This reduces the working stock of converters because there is no need for work stock of between for example 5 days and 4 weeks, which results in huge cost savings. Further, the products obtained with the polyethylene composition according to the invention can be converted successfully shortly after foam production, i. e. after 48 hours, without collapsing and without dimensional change. In addition, the polyethylene composition according to the invention results in laminated products without blisters and without delamination.

Further, the polyethylene composition shows no deviations in processing behavior when applied on single screw foam extruder, twin screw foam extruder and tandem foam extruder. The results obtained are the same.

Further advantages of the invention are the good processing behavior, the excellent dimensional stability of the whole coil for, for example 0.8 mm foam and the reduction of scrap ratio by 30% during production of foamed articles.

Furthermore, the composition leads to a low density foam with high compression strength and low corrugation.

Preferably, the polyethylene composition is based on a polyethylene blend comprising low density polyethylene in the range from 97.0% to 99.5% by weight and high density polyethylene in the range from 0.5% to 3.0% by weight, based on the total amount of low density polyethylene and high density polyethylene.

More preferably, the polyethylene composition is based on a polyethylene blend comprising low density polyethylene in the range from 97.1% to 99.0% by weight and high density polyethylene in the range from 1.0% to 2.9% by weight, based on the total amount of low density polyethylene and high density polyethylene.

LDPE can be blended with HDPE for example after the production of LDPE during granulation or during the production of the foam using mixing equipment, for example a single-screw extruder or a twin-screw extruder.

Preferably, HDPE and LDPE are blended during granulation after the production of LDPE. This method of blending results in a uniform mix of HDPE in LDPE and in excellent foaming performances.

The amount of HDPE in LDPE can be detected using standard DSC or TREF DSC. The peak of HDPE is observed during heating and also cooling of the melt.

Preferably the wt % of glycerol-mono-stearate is higher than the wt % of glycerol-mono-palmitate in the mixture of glycerol-mono-stearate and glycerol-mono-palmitate.

The weight ratio of glycerol-mono-stearate to glycerol-mono-palmitate in the mixture of glycerol-mono-stearate and glycerol-mono-palmitate may range from 0.8 to 4, preferably from 1.0 to 3.5, more preferably from 1.5 to 3.0, most preferably from 2.0 to 3.0.

The polyethylene composition may comprise
a) a polyethylene blend comprising from 95.5% to 99.5 wt % low density polyethylene (LDPE) and from 0.5% to 4.5 wt % high density polyethylene (HDPE), wherein the wt % (% by weight) is based the total amount of low density polyethylene and high density polyethylene in the blend, and
b) a mixture of glycerol-mono-stearate and glycerol-mono-palmitate, wherein the wt % of glycerol-mono-stearate is higher than the wt % of glycerol-mono-palmitate in the mixture of glycerol-mono-stearate and glycerol-mono-palmitate.

Preferably, the polyethylene composition may comprise
a) a polyethylene blend comprising from 95.5% to 99.5 wt % low density polyethylene (LDPE) and from 0.5% to 4.5 wt % high density polyethylene (HDPE), wherein the wt % (% by weight) is based the total amount of low density polyethylene and high density polyethylene in the blend, and
b) a mixture of glycerol-mono-stearate and glycerol-mono-palmitate, wherein the weight ratio of glycerol-mono-stearate to glycerol-mono-palmitate in the mixture of glycerol-mono-stearate and glycerol-mono-palmitate may range from 0.8 to 4.

More preferably, the polyethylene composition may comprise
a) a polyethylene blend comprising from 95.5% to 99.5 wt % low density polyethylene (LDPE) and from 0.5% to 4.5 wt % high density polyethylene (HDPE), wherein the wt % (% by weight) is based the total amount of low density polyethylene and high density polyethylene in the blend, and
b) a mixture of glycerol-mono-stearate and glycerol-mono-palmitate, wherein the weight ratio of glycerol-mono-stearate to glycerol-mono-palmitate in the mixture of glycerol-mono-stearate and glycerol-mono-palmitate may range from 1.0 to 3.5.

Even more preferably, the polyethylene composition may comprise
a) a polyethylene blend comprising from 95.5% to 99.5 wt % low density polyethylene (LDPE) and from 0.5% to 4.5 wt % high density polyethylene (HDPE), wherein the wt % (% by weight) is based the total amount of low density polyethylene and high density polyethylene in the blend, and
b) a mixture of glycerol-mono-stearate and glycerol-mono-palmitate, wherein the weight ratio of glycerol-mono-stearate to glycerol-mono-palmitate in the mixture of glycerol-mono-stearate and glycerol-mono-palmitate may range from 2.0 to 3.0.

Preferably, the mixture of glycerol-mono-stearate and glycerol-mono-palmitate was added to the composition as a masterbatch comprising glycerol-mono-stearate, glycerol-mono-palmitate and LDPE.

Masterbatch needs to be understood as a concentrated mixture of glycerol-mono-stearate and glycerol-mono-palmitate provided together with a polymer as carrier. The carrier may for example be LDPE.

Preferably the mixture of glycerol-mono-stearate and glycerol-mono-palmitate is a masterbatch of glycerol-mono-stearate and glycerol-mono-palmitate mixture in LDPE. Preferably the masterbatch comprises 50% by weight of the mixture of glycerol-mono-stearate and glycerol-mono-palmitate based on the total amount of all components in the masterbatch.

The total amount of polyethylene blend in the polyethylene composition may range from 90.0 to 99.9 wt %, preferably from 95.0 to 99.9 wt %, most preferably from 97.2 to 99.9 wt % based on the total amount of polyethylene blend and mixture of glycerol-mono-stearate and glycerol-mono-palmitate and/or the amount of the mixture of glycerol-mono-stearate and glycerol-mono-palmitate may range from 0.1 to 10.0 wt %, more preferably from 0.1 to 5.0 wt %, most preferably from 0.1 to 2.8 wt % based on the total amount of polyethylene blend and mixture of glycerol-mono-stearate and glycerol-mono-palmitate.

Preferably, the total amount of polyethylene blend in the polyethylene composition may range from 90.0 to 99.9 wt %, based on the total amount of polyethylene blend and mixture of glycerol-mono-stearate and glycerol-mono-palmitate, and the amount of the mixture of glycerol-mono-stearate and glycerol-mono-palmitate may range from 0.1 to 10.0 wt % based on the total amount of polyethylene blend and mixture of glycerol-mono-stearate and glycerol-mono-palmitate.

More preferably, the total amount of polyethylene blend in the polyethylene composition may range from 95.0 to 99.9 wt %, based on the total amount of polyethylene blend and mixture of glycerol-mono-stearate and glycerol-mono-palmitate, and the amount of the mixture of glycerol-mono-stearate and glycerol-mono-palmitate may range from 0.1 to 5.0 wt % based on the total amount of polyethylene blend and mixture of glycerol-mono-stearate and glycerol-mono-palmitate.

Most preferably, the total amount of polyethylene blend in the polyethylene composition may range from 97.2 to 99.9 wt % based on the total amount of polyethylene blend and mixture of glycerol-mono-stearate and glycerol-mono-palmitate and the amount of the mixture of glycerol-mono-stearate and glycerol-mono-palmitate may range from 0.1 to 2.8 wt % based on the total amount of polyethylene blend and mixture of glycerol-mono-stearate and glycerol-mono-palmitate.

The polyethylene composition may comprise
a) a polyethylene blend comprising from 95.5% to 99.5 wt % low density polyethylene (LDPE) and from 0.5% to 4.5 wt % high density polyethylene (HDPE), wherein the wt % (% by weight) is based the total amount of low density polyethylene and high density polyethylene in the blend, and
b) a mixture of glycerol-mono-stearate and glycerol-mono-palmitate, and wherein
the total amount of polyethylene blend in the polyethylene composition may range from 90.0 to 99.9 wt %, based on the total amount of polyethylene blend and mixture of glycerol-mono-stearate and glycerol-mono-palmitate and the amount of the mixture of glycerol-mono-stearate and glycerol-mono-palmitate may range from 0.1 to 10.0 wt % based on the total amount of polyethylene blend and mixture of glycerol-mono-stearate and glycerol-mono-palmitate.

The polyethylene composition may comprise
a) a polyethylene blend comprising from 95.5% to 99.5 wt % low density polyethylene (LDPE) and from 0.5% to 4.5 wt % high density polyethylene (HDPE), wherein the wt % (% by weight) is based the total amount of low density polyethylene and high density polyethylene in the blend, and
b) a mixture of glycerol-mono-stearate and glycerol-mono-palmitate, and wherein
the total amount of polyethylene blend in the polyethylene composition may range from 97.2 to 99.9 wt % based on the total amount of polyethylene blend and mixture of glycerol-mono-stearate and glycerol-mono-palmitate and/or the amount of the mixture of glycerol-mono-stearate and glycerol-mono-palmitate may range from 0.1 to 2.8 wt % based on the total amount of polyethylene blend and mixture of glycerol-mono-stearate and glycerol-mono-palmitate.

The polyethylene composition may comprise
a) a polyethylene blend comprising from 95.5% to 99.5 wt % low density polyethylene (LDPE) and from 0.5% to 4.5 wt % high density polyethylene (HDPE), wherein the wt % (% by weight) is based the total amount of low density polyethylene and high density polyethylene in the blend, and
b) a mixture of glycerol-mono-stearate and glycerol-mono-palmitate, wherein the weight ratio of glycerol-mono-stearate to glycerol-mono-palmitate in the mixture of glycerol-mono-stearate and glycerol-mono-palmitate may range from 1.0 to 3.5, and wherein
the total amount of polyethylene blend in the polyethylene composition may range from 97.2 to 99.9 wt % based on the total amount of polyethylene blend and mixture of glycerol-mono-stearate and glycerol-mono-palmitate and/or the amount of the mixture of glycerol-mono-stearate and glycerol-mono-palmitate may range from 0.1 to 2.8 wt % based on the total amount of polyethylene blend and mixture of glycerol-mono-stearate and glycerol-mono-palmitate.

The density of LDPE may range from 915 kg/m$^3$ to 935 kg/m$^3$, preferably from 920 kg/m$^3$ to 930 kg/m$^3$ measured according to ISO 1183 and/or the melt flow rate (MFR) of LDPE at 2.16 kg load and 190° C. measured according to ASTM D1133 may range from 0.1 to 30 g/10 min, preferably from 0.1 to 10 g/10 min, more preferably from 0.5 to 5.0 g/10 min.

The density of LDPE may range for example from 915 kg/m$^3$ to 935 kg/m$^3$, measured according to ISO 1183 and the melt flow rate (MFR) of LDPE at 2.16 kg load and 190° C. measured according to ASTM D1133 may range from 0.1 to 30 g/10 min.

Most preferably, the density of LDPE may range from 920 kg/m3 to 930 kg/m$^3$ measured according to ISO 1183 and the melt flow rate (MFR) of LDPE at 2.16 kg load and 190° C. measured according to ASTM D1133 may range 0.5 to 5.0 g/10 min.

The LDPE may be obtained for example by a tubular process or by an autoclave process.

The production processes of LDPE is summarised in Handbook of Polyethylene by Andrew Peacock (2000; Dekker; ISBN 0824795466) at pages 43-66.

It is herein understood that the term LDPE includes both an LDPE homopolymer and an LDPE copolymer. Preferably, the LDPE is a copolymer.

The LDPE copolymer may be a copolymer of ethylene and a suitable comonomer well known to the skilled person, such as alkenes, cycloalkenes and dienes. Suitable comonomers include α-olefins with 3-12 C atoms, ethylenically unsaturated carboxylic acids, ethylenically unsaturated C4-15 carboxylic acid esters or their anhydrides. Examples of suitable α-olefins to be applied as a comonomer are propylene and/or butene. Examples of suitable ethylenically unsaturated carboxylic acids are maleic acid, fumaric acid, itaconic acid, acrylic acid, methacrylic acid and/or crotonic acid. Examples of ethylenically unsaturated C4-15 carboxylic acid esters or their anhydrides are methyl(meth)acrylate, ethyl(meth)acrylate, hydroxyethyl (meth)acrylate, hydroxypropyle(meth)acrylate, n-butyl methacrylate, vinyl acetate, methacrylic acid anhydride, maleic acid anhydride, 1,4-butanedioldimethacrylate, hexanediol dimethacrylate, 1,3-butylene glycol dimethacrylate, ethylene glycol dimethacrylate, dodecanediol dimethacrylate, trimethylol propane trimethacrylate, trimethacrylate ester and/or itaconic acid anhydride. Also bifunctional alkadienes for example 1,5-hexadiene, 1,7-octadiene, 1,9-decadiene and 1,13-tetradecadiene may be applied. The quantity of comonomer in the polymer is dependent on the desired application.

Such LDPE can be obtained via the high pressure radical polymerization of ethylene or ethylene and one or more comonomers in an autoclave or a tubular reactor.

Preferably, the LDPE has Mn of at least 5.0 kg/mol according to size exclusion chromatography and Mw of at least 50 kg/mol according to size exclusion chromatography. The LDPE may have an Mn of at most 25.0 kg/mol, for example at most 20.0 kg/mol, for example at most 17.5 kg/mol, according to size exclusion chromatography. The LDPE may have an Mw of at most 350 kg/mol, for example at most 330 kg/mol, for example at most 300 kg/mol, for example at most 250 kg/mol, according to size exclusion chromatography. The LDPE may have Mn of 5.0-10.0 kg/mol according to size exclusion chromatography and Mw of 50-200 or 50-150 kg/mol according to size exclusion chromatography. In other embodiments, the LDPE may have Mn of 10.0-20.0 kg/mol and Mw of 150-250 or 150-200 kg/mol according to size exclusion chromatography.

For size exclusion chromatography, the polymer samples are dissolved (0.9 mg/ml) in 1,2,4-trichlorobenzene (TCB), which is distilled prior to use, over a period of 4 h at 150° C. and stabilized with butylated hydroxytoluene (BHT) at a concentration of 1 mg/ml. The solutions are filtered at high temperature (150° C.) using a millipore filtration setup (1.2 mm) positioned in a Hereous LUT oven operating at 150° C. The separation of the polymer according to molar mass may be performed with a Polymer Laboratories PL GPC210. This SEC system is operated at high temperature (column compartment at 160° C., injector compartment at 160° C., and solvent reservoir at 35° C.), and a flow of 0.5 ml/min. Eluent is 1,2,4-trichlorobenzene. Two Polymer Laboratories SEC columns with large particle size (PLGel mixed A-LS 20 mm columns) in series are used to minimize shear degradation of high molar mass polymer chains. The light scattering detector (a WYATT DAWN EOS multi-angle laser light scattering detector) is placed in line between the SEC and the refractive index detector. The used dn/dc=0.097 ml/g.

Preferably, the LDPE is produced in a tubular reactor which is operated at a pressure of ≥200 and ≤280 MPa and an average reaction peak temperature of ≥220° C. and ≤300° C. The LDPE may comprise one or more of co-monomers, which is fed to the reactor in one or more feed inlets of said tubular reactor; and each co-monomer is preferably fed to the tubular reactor in quantities of ≤2.0 mol % with regard to the total feed composition, and wherein the obtained ethylene copolymer has a co-monomer content of at least ≥0.2 mol % and at most ≤6 mol % with respect to the total mol % of ethylene and the one or more co-monomers.

Generally, the density of HDPE ranges from 940 kg/m³ to 970 kg/m³, preferably from 950 kg/m³ to 970 kg/m³, more preferably from 960 kg/m³ to 970 kg/m³ measured according to ISO 1183 and/or the MFR of HDPE at 2.16 kg load and 190° C. measured according ASTM D1133 ranges from 0.1 to 20 g/10 min, preferably from 0.1 to 15 g/10 min, more preferably from 4.0 to 15 g/10 min.

The density of HDPE may range from 940 kg/m³ to 970 kg/m³, measured according to ISO 1183 and the MFR of HDPE at 2.16 kg load and 190° C. measured according ASTM D1133 may range from 0.1 to 20 g/10 min.

Preferably, the density of HDPE ranges from 950 kg/m³ to 970 kg/m³, more preferably from 960 kg/m³ to 970 kg/m³ measured according to ISO 1183 and the MFR of HDPE at 2.16 kg load and 190° C. measured according ASTM D1133 ranges from 0.1 to 15 g/10 min.

More preferably, the density of HDPE ranges from 960 kg/m³ to 970 kg/m³ measured according to ISO 1183 and the MFR of HDPE at 2.16 kg load and 190° C. measured according ASTM D1133 ranges from 4.0 to 15 g/10 min.

HDPE may be obtained either by a gas phase process, a slurry process and a solution process.

The HDPE may be unimodal HDPE or multimodal HDPE for example bimodal HDPE or trimodal HDPE. Preferably, the HDPE is bimodal HDPE.

The production processes of the HDPE and is summarised in "Handbook of Polyethylene" by Andrew Peacock (2000; Dekker; ISBN 0824795466) at pages 43-66. Suitable catalysts for the production of polyethylene include Ziegler Natta catalysts, chromium based catalysts and single site metallocene catalysts.

The unimodal polyethylene may be obtained for example by polymerizing ethylene and optionally at least one olefin comonomer in slurry in the presence of a silica-supported chromium-containing catalyst and/or an alkyl boron compound. Suitable comonomers include for example propylene, 1-butene, 1-pentene, 4-methyl-1-pentene, 1-hexene and/or 1-octene. The unimodal polyethylene may be obtained for example by polymerizing ethylene and optionally at least one olefin comonomer in a gas phase polymerisation or in slurry polymerisation process.

The production processes for bimodal high density polyethylene (HDPE) are summarised at pages 16-20 of "PE 100 Pipe systems" (edited by Bromstrup; second edition, ISBN 3-8027-2728-2). The production of bimodal high density polyethylene (HDPE) via a low pressure slurry process is described by Alt et al. in "Bimodal polyethylene-Interplay of catalyst and process" (Macromol. Symp. 2001, 163, 135-143). The characteristics of the polyethylene are determined amongst others by the catalyst system and by the concentrations of catalyst, comonomer and hydrogen. The production of bimodal high density polyethylene (HDPE) via a low pressure slurry process may also be performed via a three stage process. The concept of the two stage cascade process is elucidated at pages 137-138 by Alt et al. "Bimodal polyethylene-Interplay of catalyst and process" (Macromol. Symp. 2001, 163).

The composition according to the invention may comprise a nucleating agent. These agents may be necessary to increase the cell density and to modify the dynamics of bubble formation and growth. (Gendron, Thermoplastic foam Processing, 2005, page 209)

Suitable nucleating agents include for example talcum, silica and a mixture of sodium bicarbonate and citric acid. Other suitable nucleating agents include an amide, an amine and/or an ester of a saturated or unsaturated aliphatic ($C_{10}$-$C_{34}$) carboxylic acid. As disclosed in EP-A-1308475 the presence of nucleating agents result in a highly regular, fine cellular foam structure and soft surface.

Examples of suitable amides include fatty acid (bis) amides such as for example stearamide, caproamide, caprylamide, undecylamide, lauramide, myristamide, palmitamide, behenamide and arachidamide, hydroxystearamides and alkylenediyl-bis-alkanamides, preferably ($C_2$-$C_{32}$) alkylenediyl-bis-($C_2$-$C_{32}$) alkanamides, such as for example ethylene bistearamide (EBS), butylene bistearamide, hexamethylene bistearamide and/or ethylene bisbehenamide.

Suitable amines include or instance ($C_2$-$C_{18}$) alkylene diamines such as for example ethylene biscaproamine and hexamethylene biscaproamine.

Preferred esters of a saturated or unsaturated aliphatic ($C_{10}$-$C_{34}$) carboxylic acid are the esters of an aliphatic ($C_{16}$-$C_{24}$) carboxylic acid.

Generally, the nucleating agent is present in an amount between 0.1 and 4.0 wt % relative to the polyethylene blend. Preferably the nucleating agent is present in an amount between 0.5 and 1.0 wt % relative to the polyethylene blend.

According to a preferred embodiment of the invention the nucleating agent is ethylene bis stearamide or talcum.

The invention relates further to a process for physical foaming of the polyethylene composition according to the invention in the presence of a blowing agent selected from isobutane, $CO_2$, pentane, butane, nitrogen and/or a fluorohydrocarbon. Preferably, the physical blowing agent is isobutane.

The process for physical foaming of polyethylene composition according to the invention may be performed in the presence of a physical blowing agent, a nucleating agent, a cell stabiliser and/or other additives.

Preferably, the foaming process takes place at a temperature lower than 110° C.

The composition may additionally contain other additives such as for example flame retardants, pigments, lubricants, flow promoters, antistatic agents, processing stabilizers, long term stabilisers, infrared blockers and/or UV stabilizers. The additives may be present in any desired amount to be determined by the man skilled in the art.

Requirements for physical foaming of polyolefin compositions are disclosed in "How to choose a polyolefin grade for physical foaming" by Henk Ruinaart (Blowing agents and foaming processes 2005; Stuttgart Germany 10-11 May 2005).

A foamed polyethylene composition may be obtained by foaming the polyethylene composition according to the invention in a physical foaming process in the presence of a physical blowing agent.

The use of this polyethylene composition in the physical foaming process in the presence of the physical blowing agent results in a reduction of physical blowing agent of more than 50% by weight (relative to the original amount of blowing agent immediately after production of the foamed article) during a period of less than 120 hours, preferably less than 96 hours and more preferably less than 48 hours.

The gas exchange in the foamed article is measured by monitoring the weight of the article for example a roll of product during a time period. At the beginning the product contains isobutane which is exchanged over time with air. Isobutane has a higher density (2, 44 kg/m³ at 25° C.) than air (1, 18 kg/m³ at 25° C.). By measuring the weight-loss of the foamed product, the isobutane degassing amount can be calculated. 100% gas exchange took place when no weight change over time is observed anymore.

Alternatively, the gas exchange can be monitored via gas chromatography. Therefore, the foamed samples are collected in vials at various times (t) after production and directly after production at time $t_0$ and closed hermetically. Foamed samples are melted inside the hermetically closed vials during a heating step at 140° C. before the gas is collected and injected on a gas chromatograph. The sample are analyzed by headspace gas chromatography with FID (flame ionisation detector) detection on a Perkin Elmer. A standard of pentane is used for quantification, since the response on the FID is comparable with isobutane.

The invention deals also with an article, preferably a foamed article, made from the polyethylene composition according to the invention or made from the polyolefin composition obtained by or obtainable by the process according to the invention.

The invention deals also with film, sheet, profile, rod, plank or tube made from the polyethylene composition according to the invention or made from the polyolefin composition obtained by or obtainable by the process according to the invention.

The production of sheets may be divided in the production of thin sheets, for example in the range between 0.5 and 3 mm and in the production of thick sheets for example in the range between 3 and 25 mm.

Further, the present invention relates to the use of the polyethylene composition for the production of an article.

The present invention may also relate to the use of the polyethylene composition for the production of film, sheet, profile, rod, plank or tube.

The foamed article may be used in or may be used as such for (floor, ceiling, wall, cold and/or hot water copper or plastic pipe) insulation, (protective) packaging, used in sport and leisure articles (e.g. swimming suits), for floatation and decoration purposes, for sound isolation and sound prevention. The foamed article may be used in lamination process with other foamed articles or film or sheet, or other non-foamed articles.

The invention will be elucidated by means of the following non-restrictive examples.

EXAMPLES

Materials

Polyolefin 1 LDPE

Polyolefin 1 is LDPE with a density of 921 kg/m³ measured according to ISO 1183 and MFR of 1.9 g/10 min measured at 190° C. and a load of 2.16 kg according to ASTM D1133.

Polyolefin 2 LDPE/HDPE Composition

Polyolefin 2 is a polyethylene blend of LDPE with a density of 921 kg/m³ measured according to ISO 1183 and MFR of 1.9 g/10 min measured at 190° C. and a load of 2.16 kg according to ASTM D1133 and HDPE with a density of 964 kg/m³ measured according to ISO 1183 and a MFR of 8.0 g/10 min measured at 190° C. and a load of 2.16 kg according to ASTM D1133. HDPE and LDPE were blended at 180 degrees Celsius in a ratio of 39:1 by using a compounding extruder.

The wt % of HDPE is 2.5% based on the total amount of LDPE and HDPE.

Cell Stabilizer 1

Glycerol-mono-stearate and glycerol-mono-palmitate were added via masterbatch. The masterbatch was comprising 50% by weight of a mixture of glycerol-mono-stearate and glycerol-mono-palmitate and 50% by weight of LDPE.

The weight ratio of glycerol-mono-stearate to glycerol-mono-palmitate in the masterbatch was 2.5.

Cell Stabilizer 2

Glycerol-mono-stearate and glycerol-mono-palmitate were added via masterbatch. The masterbatch was comprising 50% by weight of a mixture of glycerol-mono-stearate and glycerol-mono-palmitate and 50% by weight of LDPE.

The weight ratio of glycerol-mono-stearate to glycerol-mono-palmitate was 1.1.

Foaming Process and Measurements

The polyolefin (LDPE or LDPE/HDPE composition) was added to a physical foaming extruder.

The composition to be foamed was comprising
- 85.0% by weight of the polyolefin (LDPE or LDPE/HDPE composition),
- 11.5% by weight isobutane
- 1.75% by weight talcum masterbatch (50% masterbatch of talcum in LDPE) and
- 1.75% by weight of the masterbatch (cell stabilizer 1 or cell stabilizer 2).

The temperatures of the melting zones were set on a flat profile of 165 degrees Celsius. Cooling temperatures were set on 107 degrees Celsius.

A sheet (1.2 mm thickness) with a density of 31 kg/m³ was produced. The density was measured by water immersion method.

After producing the foam at 20 degrees Celsius via the regular physical extrusion process with isobutane, the time of a 50% reduction in concentration of isobutane was determined. The gas exchange in the foamed article was measured by monitoring the weight of the sheet during a certain time period. At the beginning the product was filled with isobutane and over time exchanged with air. Isobutane has a higher density (2, 44 kg/m³ at 25° C.) than air (1, 18 kg/m³ at 25° C.). By measuring the weight-loss of the product the isobutane degassing amount was calculated. 100% gas exchange took place when no weight change over time was observed anymore.

Composition of Samples and Measurement Results

| Sample | Polyolefin | Cell stabilizer | Time of 50% of degassing of isobutane in hours |
|---|---|---|---|
| Inv. 1 | 2 (LDPE/HDPE) | 1 | 34 h |
| Inv. 2 | 2 (LDPE/HDPE) | 2 | 82 h |
| Comp. 1 | 1 (LDPE) | 1 | 115 h |
| Comp. 2 | 1 (LDPE) | 2 | 202 h |

These experiments show that the use of the LDPE/HDPE mixture (compared to LDPE) in combination with the glycerol-mono-stearate and glycerol-mono-palmitate mixture improves the degassing of the foamed article.

In FIG. 1 the degassing process is shown as the weight change (%) of the foam over time (days). As one can see a much faster gas exchange is obtained for the inventive examples in comparison to the comparative examples.

The invention claimed is:

1. A polyethylene composition comprising:
   a) a polyethylene blend comprising from 95.5 weight percent to 99.5 weight percent low density polyethylene and from 0.5% to 4.5 weight percent high density polyethylene, wherein the weight percent is based a total amount of low density polyethylene and high density polyethylene in the blend, and
   b) a mixture of glycerol-mono-stearate and glycerol-mono-palmitate,
   wherein a weight ratio of glycerol-mono-stearate to glycerol-mono-palmitate in the mixture of glycerol-mono-stearate and glycerol-mono-palmitate ranges from 2.0 to 3.

2. The polyethylene composition according to claim 1, wherein the mixture of glycerol-mono-stearate and glycerol-mono-palmitate is added to the composition as a masterbatch comprising glycerol-mono-stearate, glycerol-mono-palmitate and low density polyethylene.

3. The polyethylene composition according to claim 1, wherein a total amount of the polyethylene blend in the polyethylene composition ranges from 90.0 to 99.9 weight percent, based on a total amount of the polyethylene blend and the mixture of glycerol-mono-stearate and glycerol-mono-palmitate, and/or an amount of the mixture of glycerol-mono-stearate and glycerol-mono-palmitate ranges from 0.1 to 10.0 weight percent, based on a total amount of the polyethylene blend and the mixture of glycerol-mono-stearate and glycerol-mono-palmitate.

4. The polyethylene composition according to claim 1, wherein a total amount of the polyethylene blend in the polyethylene composition ranges from 95 to 99.9 weight percent, based on a total amount of the polyethylene blend and the mixture of glycerol-mono-stearate and glycerol-mono-palmitate, and/or an amount of the mixture of glycerol-mono-stearate and glycerol-mono-palmitate ranges from 0.1 to 5 weight percent, based on a total amount of the polyethylene blend and the mixture of glycerol-mono-stearate and glycerol-mono-palmitate.

5. The polyethylene composition according to claim 1, wherein a weight ratio of glycerol-mono-stearate to glycerol-mono-palmitate in the mixture of glycerol-mono-stearate and glycerol-mono-palmitate is about 2.5.

6. The polyethylene composition according to claim 1, wherein a density of low density polyethylene ranges from 915 kg/m$^3$ to 935 kg/m$^3$, measured according to ISO 1183 and/or a melt flow rate of low density of polyethylene at 2.16 kg load and 190° C. measured according to ASTM D1133 ranges from 0.1 to 30 g/10 min.

7. The polyethylene composition according to claim 1, wherein a density of high density polyethylene ranges from 940 kg/m$^3$ to 970 kg/m$^3$, measured according to ISO 1183 and/or a melt flow rate of high density polyethylene at 2.16 kg load and 190° C. measured according ASTM D1133 ranges from 0.1 to 20 g/10 min.

8. A foamed polyethylene composition obtained by foaming the polyethylene composition according to claim 1 in a physical foaming process in the presence of a physical blowing agent.

9. A process comprising physically foaming the polyethylene composition according to claim 1 in the presence of a blowing agent selected from isobutane, $CO_2$, pentane, butane, nitrogen or a fluorohydrocarbon.

10. An article comprising the polyethylene composition according to claim 1.

11. A film, sheet, profile, rod, plank or tube comprising the polyethylene composition according to claim 1.

12. An article comprising the foamed polyethylene composition according to claim 8.

13. An article comprising the foamed polyethylene composition obtained by the process according to claim 9.

14. A film, sheet, profile, rod, plank or tube comprising the foamed polyethylene composition according to claim 8.

15. A film, sheet, profile, rod, plank or tube comprising the foamed polyethylene composition obtained by the process according to claim 9.

16. A polyethylene composition comprising:
   a) a polyethylene blend comprising from 95.5 weight percent to 99.5 weight percent low density polyethylene and from 0.5% to 4.5 weight percent high density polyethylene, wherein the weight percent is based a total amount of low density polyethylene and high density polyethylene in the blend,
   wherein the low density polyethylene density has a density of 920 kg/m$^3$ to 930 kg/m$^3$, measured according to ISO 1183 and a melt flow rate at 2.16 kg load and 190° C. measured according to ASTM D1133 of 0.5 to 5 g/10 min, and
   the high density polyethylene density has a density of 960 kg/m$^3$ to 970 kg/m$^3$, measured according to ISO 1183 and a melt flow rate at 2.16 kg load and 190° C. measured according to ASTM D1133 of 4.0 to 15 g/10 min, and
   b) a mixture of glycerol-mono-stearate and glycerol-mono-palmitate, wherein a weight ratio of glycerol-mono-stearate to glycerol-mono-palmitate in the mixture of glycerol-mono-stearate and glycerol-mono-palmitate ranges from 2.0 to 3,
   wherein a total amount of the polyethylene blend in the polyethylene composition ranges from 97.2 to 99.9 wt % based on a total amount of polyethylene blend and the mixture of glycerol-mono-stearate and glycerol-mono-palmitate, and
   an amount of the mixture of glycerol-mono-stearate and glycerol-mono-palmitate ranges from 0.1 to 2.8 wt % based on the total amount of the polyethylene blend and the mixture of glycerol-mono-stearate and glycerol-mono-palmitate.

* * * * *